(12) United States Patent
Moon (10) Patent No.: US 6,948,390 B2
(45) Date of Patent: Sep. 27, 2005

(54) FLOW THROUGH PIPET

(76) Inventor: Randall A. Moon, 8804 S. 15th St., Fort Smith, AR (US) 72908

( * ) Notice: Subject to any disclaimer, the term of this patent is extended or adjusted under 35 U.S.C. 154(b) by 340 days.

(21) Appl. No.: 10/208,420

(22) Filed: Jul. 30, 2002

(65) Prior Publication Data

US 2004/0065157 A1 Apr. 8, 2004

(51) Int. Cl.⁷ .................................................. G01N 1/00
(52) U.S. Cl. .................................. 73/863.32; 73/864.22
(58) Field of Search ......................... 73/863.31, 863.32, 73/863.71, 863.83, 863.86, 864.01, 864.02, 864.03, 864.21, 864.22; 141/18, 21, 234; 222/14, 21, 205, 252, 263, 372, 377, 380, 424, 425, 426, 442

(56) References Cited

U.S. PATENT DOCUMENTS

| | | | | |
|---|---|---|---|---|
| 1,204,368 A | * | 11/1916 | Lowy ....................... | 73/864.01 |
| 1,520,637 A | * | 12/1924 | Frank ........................ | 222/158 |
| 2,233,818 A | * | 3/1941 | Matter ..................... | 137/512.2 |
| 2,434,723 A | * | 1/1948 | Shook ..................... | 73/863.71 |
| 3,415,380 A | | 12/1968 | Ellis .......................... | 210/202 |
| 3,992,947 A | | 11/1976 | Thiemann et al. ........ | 73/421 R |
| 4,043,490 A | * | 8/1977 | McKinney ................. | 222/442 |
| 4,476,095 A | | 10/1984 | Scott et al. .................. | 422/75 |
| 4,624,147 A | | 11/1986 | Kenney ................... | 73/864.15 |
| 5,090,255 A | | 2/1992 | Kenney ...................... | 73/1 R |
| 5,121,642 A | | 6/1992 | Davidowicz et al. .... | 73/864.11 |
| 5,271,902 A | | 12/1993 | Sakka et al. ................ | 422/100 |
| 5,679,575 A | | 10/1997 | Kubota et al. ................ | 436/49 |
| 5,763,278 A | | 6/1998 | Sickinger et al. ........... | 436/180 |
| 5,820,824 A | | 10/1998 | Tanaka ....................... | 422/100 |
| 6,253,628 B1 | | 7/2001 | Steele et al. ............. | 73/864.15 |

FOREIGN PATENT DOCUMENTS

| | | | | |
|---|---|---|---|---|
| DE | 743 701 C | 12/1943 | ................. | 421/302 |
| DE | 929 333 C | 6/1955 | ................. | 421/302 |
| DE | 23 46 793 A | 3/1975 | .......... | G01N/31/16 |
| FR | 1 105 300 A | 11/1955 | ...................... | 3/12 |
| GB | 1 052 748 A | 12/1966 | | |

* cited by examiner

Primary Examiner—Robert Raevis
(74) Attorney, Agent, or Firm—Fellers, Snider, Blankenship, Bailey & Tippens, P.C.

(57) ABSTRACT

The present invention is directed to a flow through pipet for sample measurement. The pipet of the invention has a body defining an interior space for receiving a fluid. The drain line is provided to drain fluid above a drain line inlet, thereby establishing a repeatable upper fluid level in the body. A dispense valve on the lower end of the body selectively permit dispensing of the fluid from the body. A restriction member may be located in the interior space of the body for defining a passageway. The drain line inlet may communicate with the passageway to establish a smaller surface area for an upper surface of the fluid, thereby minimizing a variance in the fluid level. A vent line vents gas from the measuring chamber during filling of a fluid. The pipet of the invention is particularly suitable for use in an automated system due to the top fill feature, which eliminates the need for cycling back and forth between a fill vessel and a dispense vessel. Additionally, the invention is suitable for use in an automated system utilizing a multi-pipet assembly, wherein multiple pipets may be filled simultaneously or in any manner desired.

10 Claims, 6 Drawing Sheets

FLOW THROUGH PIPET

BACKGROUND OF THE INVENTION

1. Field of the Invention

This invention relates generally to a pipet used to measure a discrete amount of a fluid. More particularly, the invention relates to a flow through pipet, wherein a fluid is delivered to the pipet through a first end and a predetermined amount of fluid is dispensed through a second end.

2. Background

Pipets are used to extract, measure and transfer a predetermined volume of a fluid. A typical pipet draws fluid by suction from a fluid source and then dispenses the fluid volume into a receiving vessel. Pipets are typically used in laboratory and clinical environments. A typical pipet includes a cylindrical vessel that is open at both ends and has a mark specifying a predefined volume and a means to apply pressure and suction to one end of the vessel.

In use, one end of the pipet is immersed in a source of fluid and suction is applied to the vessel at the other end. The operator adjusts the level of fluid in the vessel to a specified mark. Next, the pipet is positioned to access a receiving vessel and pressure or gravity forces the fluid out of the pipet into the receiving vessel. The pipet is then withdrawn from the receiving vessel and is relocated to prepare to intake the next volume of fluid from the same or another fluid source.

In addition to manual pipets, automated pipet systems have been developed. An example automated pipet system may include a syringe, a stepper motor, a three-way valve to select between intake and dispense functions, and equipment necessary to move the pipet vertically in and out of a fluid as well as equipment necessary to move the pipet horizontally from an intake location to a dispense location. Although a means to apply pressure and suction has been automated and the movement of the pipet in the x and y directions has been automated, typically the same basic design is used, wherein a cylindrical vessel is opened at both ends. Examples of typical "glass straw" pipet vessels may be found in U.S. Pat. Nos. 3,992,947, 4,476,095, 4,624,147, 5,090,255, 5,271,902, 5,679,575, 5,820,824, and 6,253,628.

A drawback with typical manual pipets and with typical automated pipets is that fluid is drawn into the pipet and dispensed from the pipet through the same orifice, which is usually located at the lower end of the pipet. Filling and dispensing of fluid from the same orifice in the pipet necessitates locating the pipet in a fluid source to fill the pipet and then relocating the pipet at a dispensing location every time it is desired to dispense a sample of fluid. Consequently, automated pipet systems require complex systems to relocate the pipet from the fluid source to the dispensing location.

A pipet is desirable that is capable of delivering a repeatable predetermined volume of fluid, wherein the pipet fills from the top and dispenses from the bottom, i.e., a flow through pipet. It is further desirable to provide a top fill pipet that does not trap air in the measuring chamber. Such a pipet could be provided in an automated pipetting system wherein the pipet would not have to be repositioned to a fill location after dispensing a fluid sample, thereby greatly simplifying an automated pipetting system.

SUMMARY OF THE INVENTION

The present invention is directed to a flow through pipet for fluid measurement. The pipet of the invention has a body defining an interior space for receiving a fluid. The drain line is provided to drain fluid in the interior space above a drain line inlet, thereby establishing a repeatable upper fluid level in the body. A dispense valve on the lower end of the body selectively permits dispensing of the fluid from the body.

A restriction member may be located in the interior space of the body for defining a passageway. The drain line inlet preferably communicates with the passageway. By locating the drain line inlet in the restriction member passageway, a smaller surface area of an upper surface of the fluid is exposed, thereby minimizing a variance in the fluid level. The drain line inlet establishes an upper end of a measuring chamber and also establishes a lower end of an overflow chamber.

The flow through pipet may further include a vent line that communicates the overflow chamber with the measuring chamber, which allows trapped gas to escape from the measuring chamber during filling of a fluid. A fill valve may be provided in the interior space, wherein the fill valve defines an upper end of an overflow chamber and a lower end of a fill chamber. The fill valve selectively permits fluid to pass from the fill chamber to the overflow chamber.

A compressed gas line may be provided that is in communication with the overflow chamber for delivering compressed gas to the interior space. A junction for separating the body into an upper segment and a lower segment is provided so that the body can be disassembled, thereby permitting the attachment of a lower segment of a desired volume to be affixed to the upper segment.

In use, a fluid is delivered into a measuring chamber through an upper end of a pipet body to fill the measuring chamber with a fluid. Fluid in excess of a predetermined amount is drained out of the drain line. The draining of excess fluid establishes an upper fluid level in the measuring chamber so that a predetermined volume of sample fluid may be established in the measuring chamber. During delivery of the fluid into the measuring chamber, gas may be vented from the measuring chamber via a separate pathway simultaneous to the filling of the measuring chamber with fluid.

Fluid may be delivered into the measuring chamber through an upper end of the body from an attached supply source, which may be desirable in an automated process. Preferably, the filling and delivering steps are achieved without moving the body in an X or Y direction. Compressed gas may be delivered into the body above the sample chamber to force the fluid out of the body or the fluid may be delivered by gravity feed.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

Referring now to the drawings wherein like elements retain the same numerical designation in the several figures.

DETAILED DESCRIPTION OF THE PREFERRED EMBODIMENT

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to FIGS. 1–6 shown are embodiments of a flow through pipet designated generally 10. Pipet 10 has a body 12. Body 12 has an upper end 14, a lower end 16 and defines an interior space 18. Supplied fluid is delivered to interior space 18 through or proximate to upper end 14.

Figure 2:
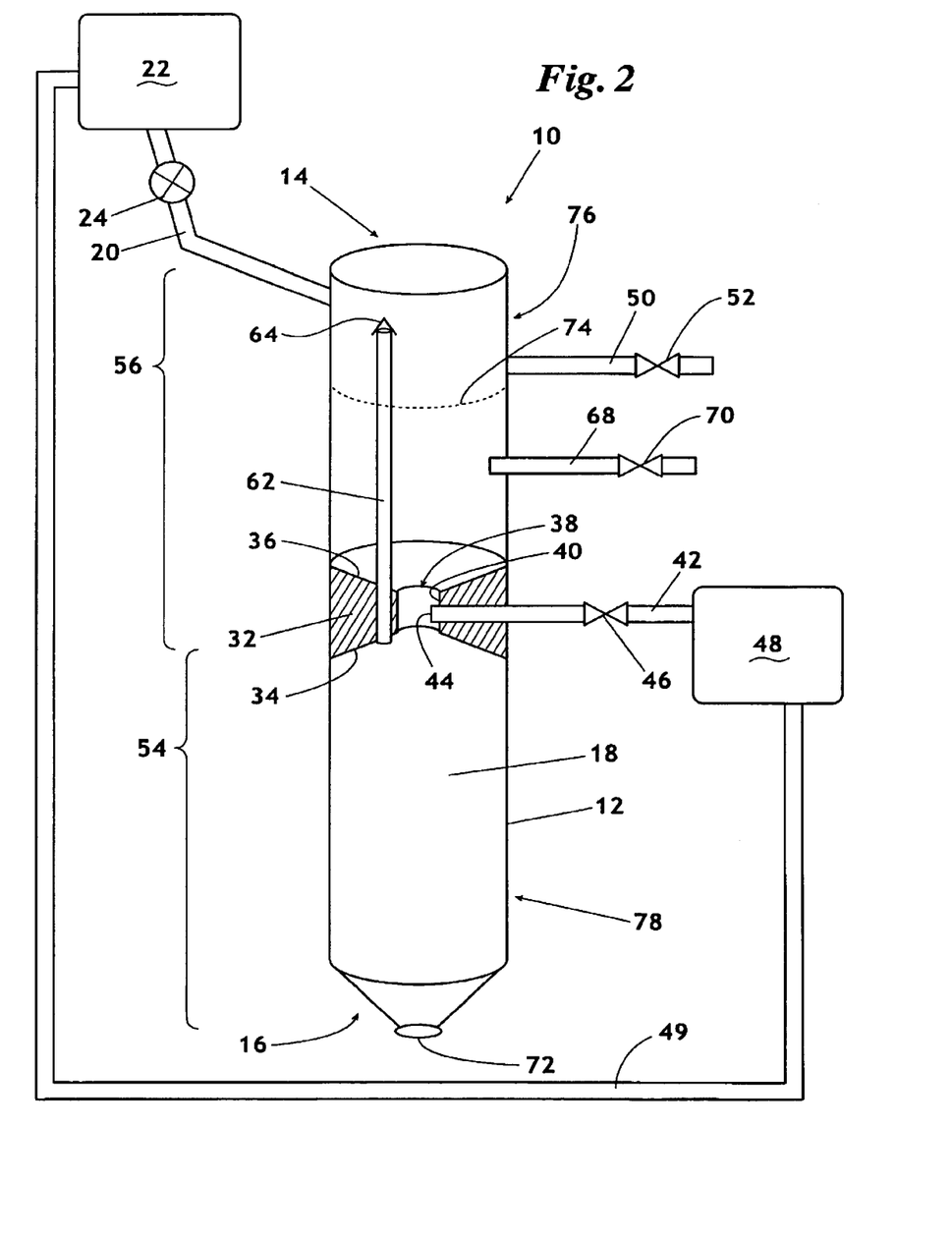
FIG. 2 is a schematic view of a pipet of the invention having a remote fluid supply, a pump, and a recirculation line for recirculating excess fluid.

In one embodiment, shown in FIG. 2, a fill line 20 is provided that communicates a remote fluid supply source 22 to interior space 18. Remote fluid supply source 22 may be a supply pump reservoir or other fluid supply source. Fill line 20 preferably communicates with interior space 18 proximate upper end 14 of body 12. A fill line valve 24 is preferably provided to control fluid flow from the fluid supply source 22.

Figure 3:
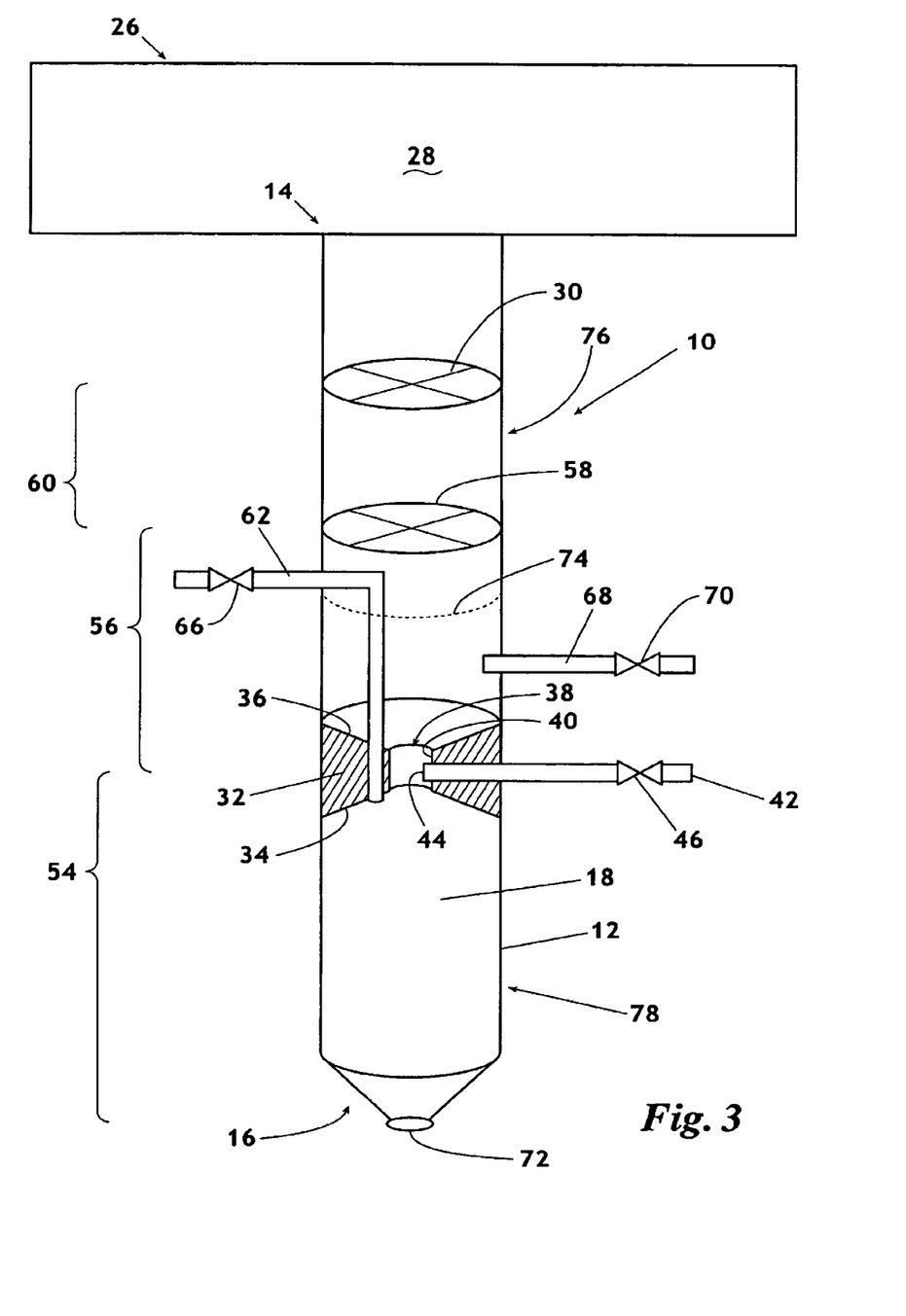
FIG. 3 is a schematic view of a pipet of the invention having a continuous supply source.

In another embodiment, shown in FIG. 3, the upper end 14 of body 12 communicates with a continuous supply source 26. Examples of a continuous supply source 26 include a process pipe, tank or other source. As shown in FIG. 3, a measured volume of fluid may be collected from process pipe 28. Still referring to FIG. 3, an isolation valve 30 is preferably provided to selectively allow supplied fluid into interior space 18 from the continuous supply source 26.

Referring back to FIGS. 1–3, a restriction member 32 may be provided in interior space 18 of body 12. Restriction member 32 has a lower surface 34, which may be conically shaped. Restriction member 32 additionally has an upper surface 36 which is preferably conical to assist in directing fluid toward a reduced area passageway 38. Reduced area passageway 38 is defined by inner walls 40 located between upper surface 36 and lower surface 34.

Figure 1:
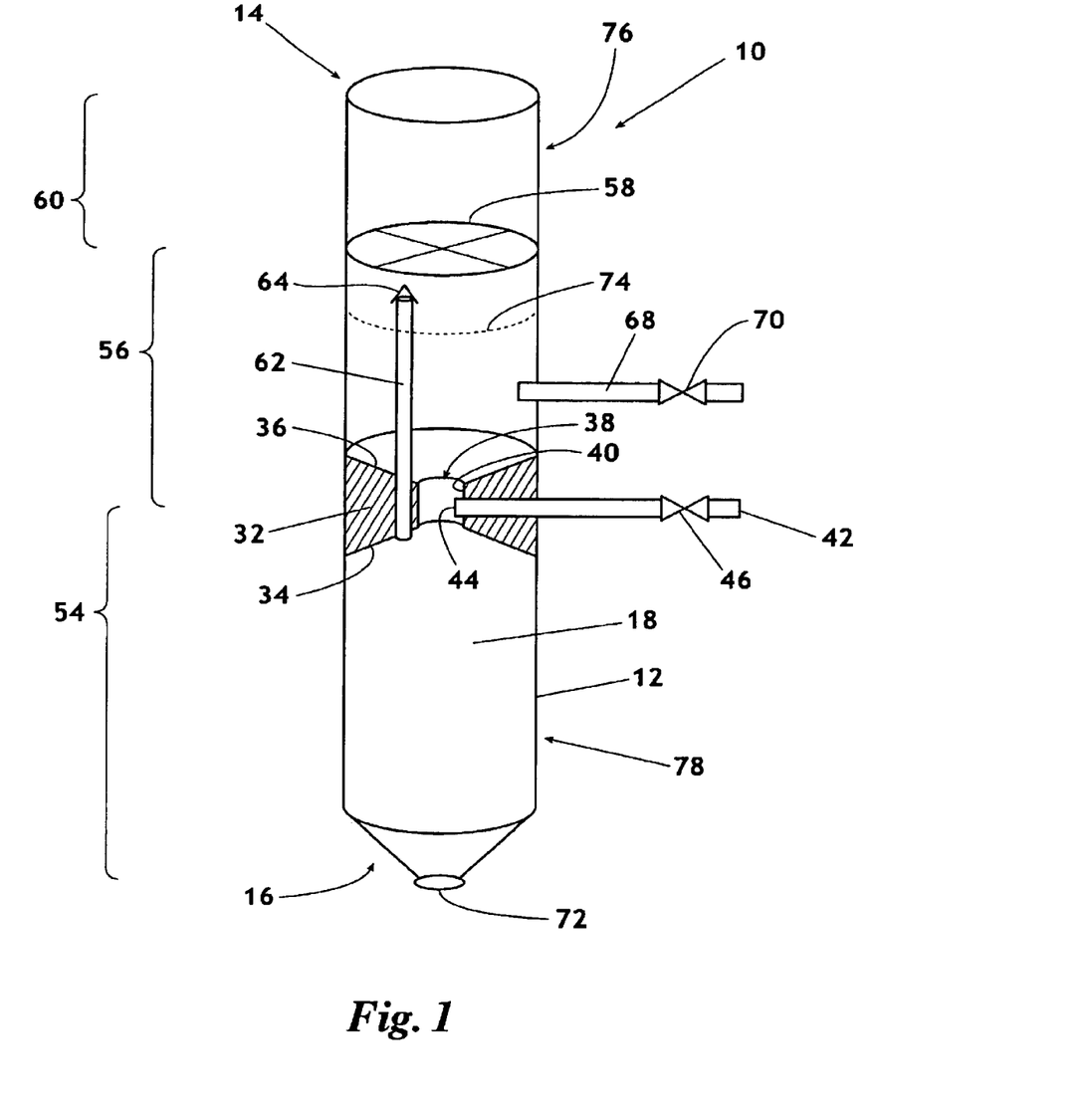
FIG. 1 is a schematic view of a pipet of the invention for sample or reagent measuring.

Still referring to FIGS. 1–3, drain line 42 has a inlet 44 that communicates with passageway 38 in interior space 18. When a restriction member 32 is used, drain line 42 preferably communicates with passageway 38. Placing inlet 44 in passageway 38 is advantageous because passageway 38 has a reduced diameter as compared to a diameter of body 12. The reduced diameter passageway 38 results in a reduced diameter of an upper surface of the fluid, thereby yielding a greater accuracy with respect to the fluid volume. A drain line valve 46 is provided to selectively open or close drain line 42.

Figure 4:
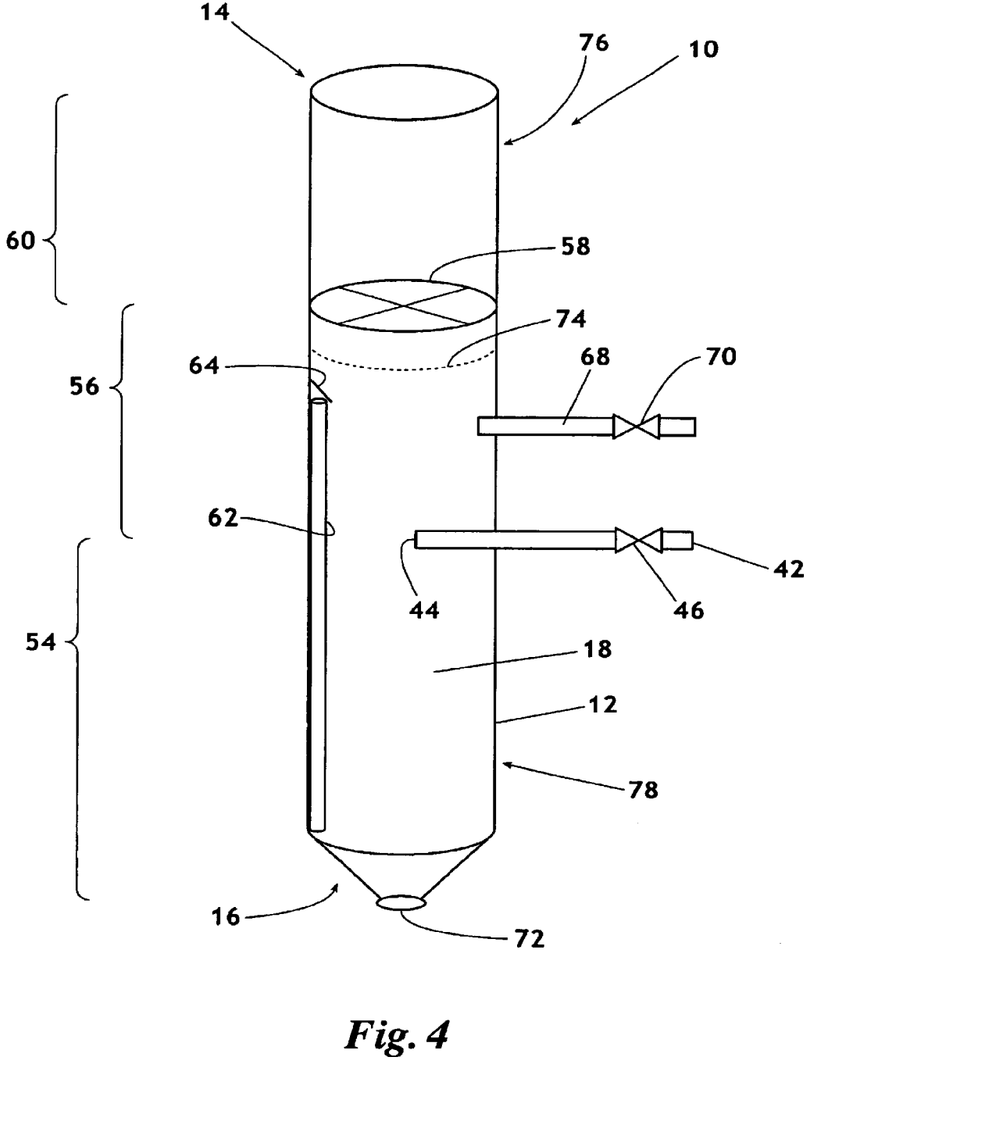
FIG. 4 is a schematic view of a pipet of the invention suitable for use with small volumes of fluid.
Figure 5:
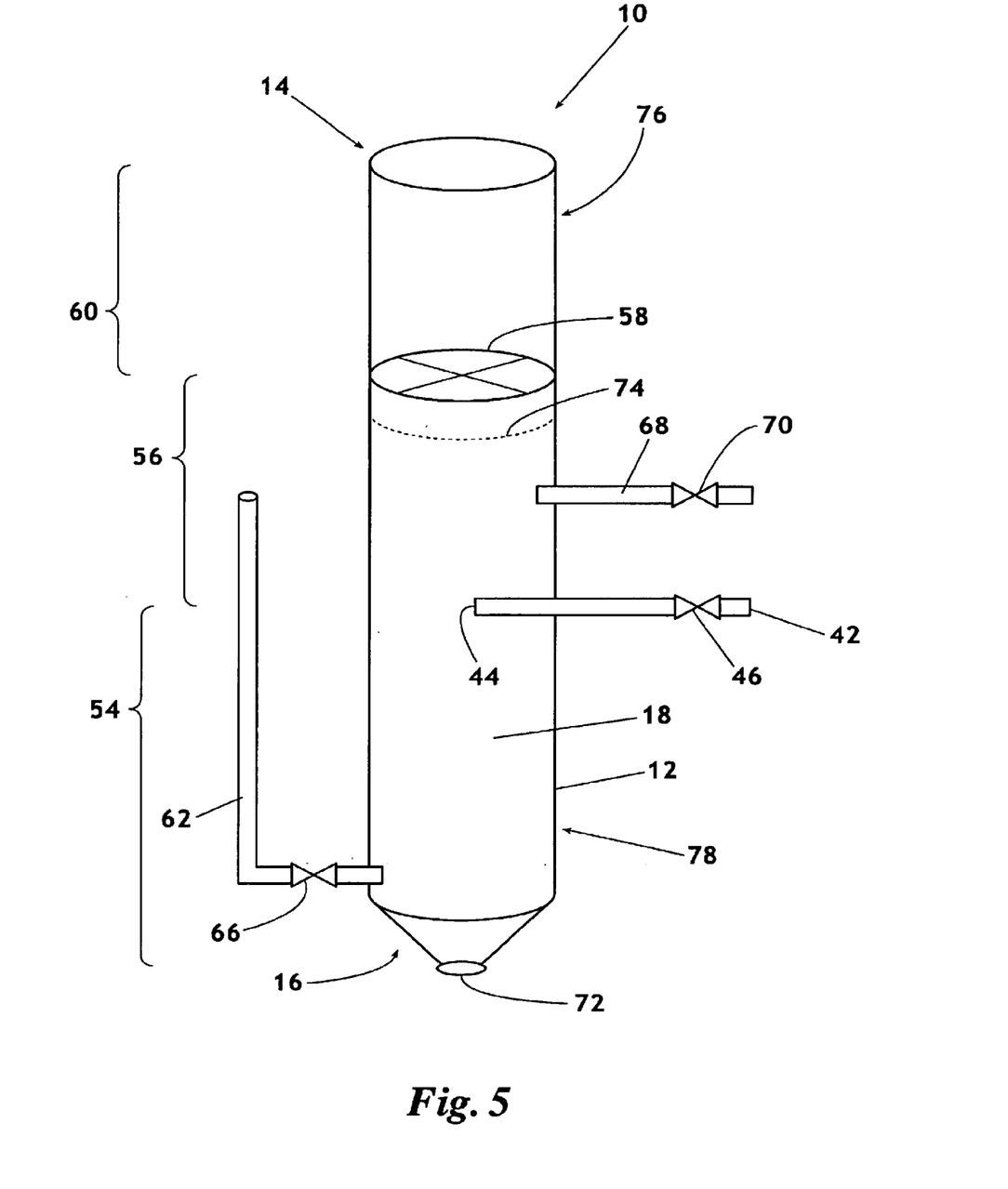
FIG. 5 is a schematic view of another embodiment of a pipet of the invention suitable for use with small volumes of fluid.

FIGS. 4 and 5 disclose pipets suitable for use with small volumes of fluid. Additionally, the pipets of FIGS. 4 and 5 could be used with any volume of fluid when less precision is required. The pipets of FIGS. 4 and 5 have no restriction members therein. Therefore, inlet 44 of drain line 42 communicates with interior space 18.

Inlet 44 defines an upper end of a measuring chamber 54 in interior space 18. Additionally, inlet 44 defines a lower end of an overflow chamber 56 in the interior space 18 (FIGS. 1–3). In all embodiments, drain line 42 defines a repeatable upper fluid level of the interior space 18 of pipet 10.

In one embodiment, shown in FIG. 2, drain line 42 communicates with a pump 48, which is used to draw excess fluid from interior space 18. The excess fluid may then be pumped through recirculation line 49 back to remote fluid supply source 22 or discarded as desired. Still referring to FIG. 2, if a drain line pump 48 is used to suck excess fluid from the interior space 18, then it is desirable to provide a pressure equalization line 50 with a pressure equalization valve 52 to allow gas to enter interior space 18 when drain line pump 48 is activated.

Referring now to FIGS. 1 and 3–5, a fill valve 58 is located in body 12 to isolate a fluid supply from a measured fluid that is located in measuring chamber 54. Fill valve 58 defines an upper end of overflow chamber 56 and defines a lower end of fill chamber 60 (FIGS. 1 and 3–5). Fill valve 58 selectively permits fluid to pass from fill chamber 60 to overflow chamber 56.

Referring now to FIGS. 1, 2 and 4, a vent line 62 is provided that communicates the overflow chamber 56 with measuring chamber 54. As shown in FIGS. 1, 2 and 4, vent line 62 is located in the interior space 18 of body 12. It is desirable to provide a weather cap 64 (FIGS. 1, 2 and 4) on an upper end of vent line 62 so that when fluids are delivered to interior space 18, fluids are prevented from entering an upper end of the vent line 62.

In other embodiments, as shown in FIGS. 3 and 5, vent line 62 communicates with an exterior of body 12. In embodiments having an exterior vent line 62, it may be desirable to provide a vent valve 66 (FIGS. 3 and 5).

A compressed gas line 68 may be provided for communicating a compressed gas source with interior space 18 (FIGS. 1–6). A compressed gas valve 70 may be provided to control access of compressed gas to the body 12. Compressed gas may be useful in forcing fluids out of lower end of 16 the pipet 10. However, compressed gas may be substituted by the use of gravity to dispense fluids from the body 12 with the pipet 10 of the invention.

A dispense valve 72 is provided on lower end 16 of body 12. Dispense valve 72 allows for selective dispensing of a fluid from measuring chamber 54. Dispense valve 72 may be any type of suitable valve known in the art. However, in a preferred embodiment, dispense valve 72 is pressure actuated. Additionally, dispense valve 72 may be manually actuated, electronically actuated, or actuated by other means.

A junction 74 may be provided so that body 12 is separatable into an upper segment 76 and a lower segment 78. Upper segment 76 and lower segment 78 may be connected at junction 74 by threads, cooperating detents and protrusions, clips or other means.

Figure 6:
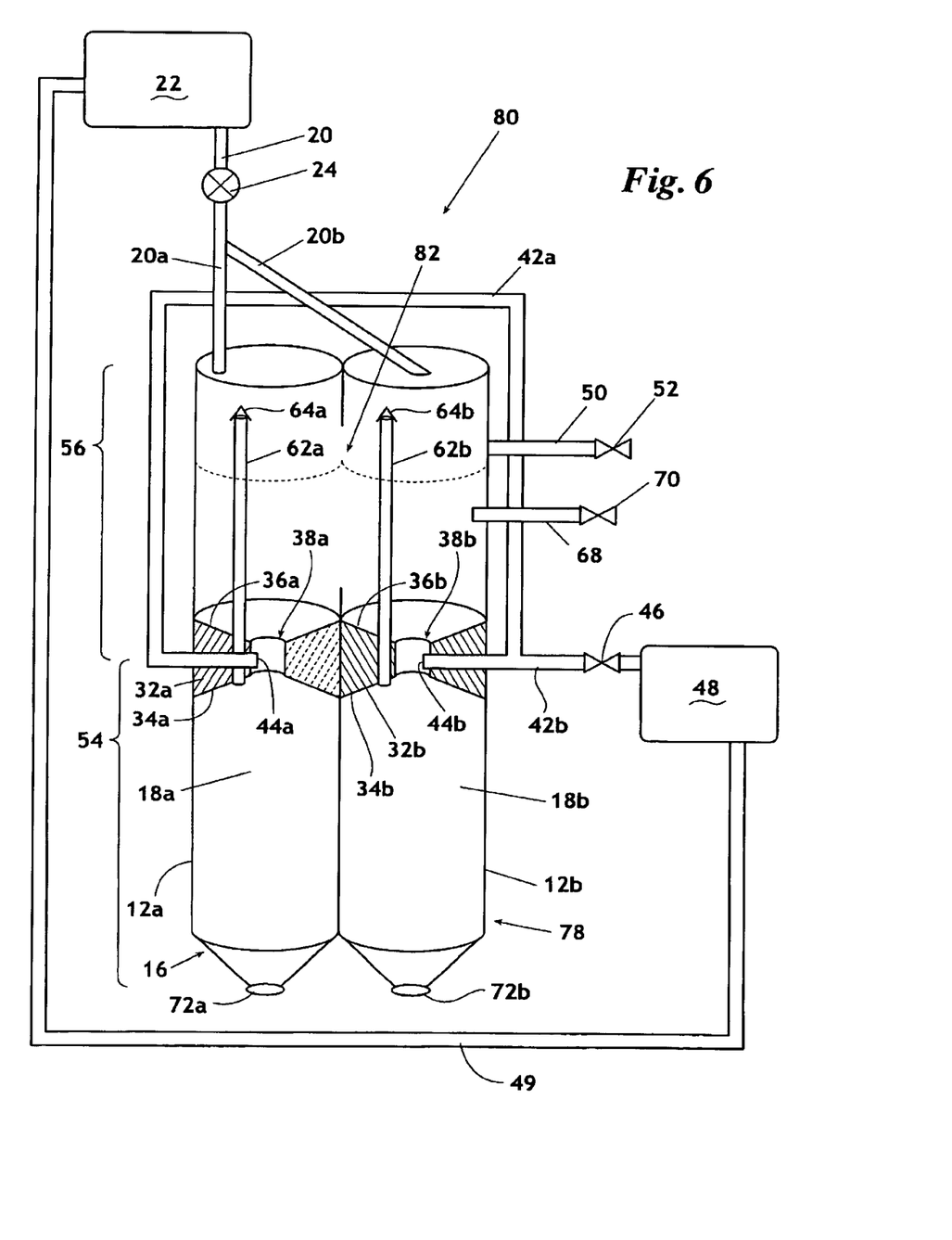
FIG. 6 is a schematic view of the pipet of the invention incorporated into a multi-pipet assembly.

FIG. 6 shows a multi-pipet assembly 80 having a fill line 20 that has multiple branches that communicate a remote fluid supply source 22 to interior space 18a and 18b of bodies 12a and 12b, respectively. Although only two pipet bodies, 12a and 12b, are shown for purposes of example, it should be noted that any number of pipet bodies 12a, 12b, 12c . . . may be incorporated into the multi-pipet assembly 80 of the invention. It should also be noted that like elements of multi-pipet assembly 80 to elements of embodiments shown in FIGS. 1–5 have retained the same numerical designation in FIG. 6, with the exception that "a" or "b" has been appended to some of the numbers to designate to which of the pipet bodies 12a, b that the numeral designations refer. For example, in a manner similar to that of the embodiment of FIG. 2, drain line pump 48 draws excess fluid from interior space 18a and 18b through drain line branches 42a and 42b. The excess fluid may then be directed through recirculation line 49 back to remote fluid supply source 22 or discarded as desired. A single pressure equalization line 50 and compressed gas line 68 may be provided, which are capable of acting upon interior spaces 18a, 18b, etc., since interior spaces 18a, 18b, etc. communicate with one another via passageway 82. Alternatively, pressure equalization line 50 and compressed gas line 68 may provide individual branches for communicating with each of interior spaces 18a, 18b, etc.

In use, a fluid is delivered into measuring chamber 54 through an upper end 14 of body 12. Fluid in excess of a desired amount drains out of drain line 42. By draining fluid out of drain line 42, an upper fluid level is established in interior space 18. The upper fluid level defines a predetermined volume of fluid in measuring chamber 54. The predetermined volume of fluid may then be dispensed out of lower end 16 of body 12 through dispense valve 72. The dispense valve 72 may be electronically actuated, manually actuated or actuated by other methods.

In one embodiment, e.g., as shown in FIGS. 1–3 and 6, the surface area of the fluid may be restricted or reduced in size as compared to the dimensions of the interior space 18 by providing a restriction member 32. For example, the drain line 42 may be located to communicate with an inner wall 40 of a restriction member 32, thereby establishing an upper fluid level having a reduced or restricted surface area. Minimizing the surface area of the fluid surface minimizes measurement error of the pipet.

To prevent gas from being trapped in the measuring chamber 54, a vent line 62 (FIGS. 1–6) may be provided. By separating the vent line 62 from the passageway 38 (FIGS. 1–3 and 6), gas may simultaneously escape from measuring chamber 54 while measuring chamber 54 is being filled with the fluid.

The delivery of fluid into interior space 18 may be accomplished via a fill line 20 (FIGS. 2 and 6), which delivers fluid to an area proximate upper end 14 of the body 12. Additionally, fluid may be delivered directly into upper end 14 of body 12 via manual delivery or delivery from a remote fluid supply source 22 (FIGS. 2 and 6) or a continuous supply source 26 (FIG. 3).

Referring back to FIGS. 2 and 6, it may be desirable to provide a pump 48 for sucking excess fluid from the interior space 18. To minimize waste of the fluid, a recirculation line 49 may be provided to route excess fluid back to a remote fluid supply source 22 where the fluid can be reintroduced into the interior space 18 via fill line 20.

Dispensing the predetermined volume of fluid may be achieved by gravity feed or, alternatively, by delivering compressed gas into the interior space 18 to force the fluid out of lower end 16 of body 12. To deliver compressed gas to interior space 18, compressed gas valve 70 is opened and gas is delivered through line 68 into interior space 18 at a location above the drain line 42.

Referring now to FIGS. 4 and 5, for dispensing very small amounts of a predetermined volume of fluid, it may be unnecessary to provide a restriction member 32, as shown in FIGS. 1–3, in the interior space 18 of the body 12. However, it may still be desirable to provide a structure for venting gas from measuring chamber 54 when fluid is delivered to the measuring chamber 54. In particular, for a very small diameter of body 12, incoming fluid may not readily permit trapped gas to escape. Therefore, in one embodiment, vent line 62 may be provided within interior space 18, where the vent line 62 has a lower opening at a location below the inlet 44 of drain line 42 and has an upper opening at a location above the inlet 44 of drain line 42. Weather cap 64 is preferably provided above the vent line 62 of FIG. 4 to prevent fluid from entering the upper opening of vent line 62. In another embodiment, as shown in FIG. 5, the vent line 62 may be provided externally to the body 12. A vent valve 66 may be provided on vent line 62.

Referring back to FIG. 3, delivery from a continuous supply source 26 may be desirable to provide a sampling device for a process stream. In this embodiment, isolation valve 30 is selectively opened to admit fluid from process pipe 28. The fluid then fills the fill chamber 60. Fill valve 58 may then be opened to allow the fluid to pass from the fill chamber 60 through overflow chamber 56, through passageway 38 and into measuring chamber 54. As the fluid fills measuring chamber 54, displaced gas is vented out through vent line 62. In this embodiment, the vented gas is vented to an exterior of body 12 through vent line 62. Once the fluid level in the measuring chamber 54 rises to the inlet 44 of level of the drain line 42, any excess fluid is drained out of interior space 18, e.g., any fluid rising into overflow chamber 56 will be drained out of interior space 18, thereby establishing a maximum volume of fluid in the measuring chamber 54.

If it is desired to use a pipet 10 having a fill valve 58, a drain valve 46 on a drain line 42, a gas valve 70 on a compressed gas line 68 and a dispense valve, then a prescribed sequence of opening and closing various valves 58, 46, 70 and 72 is desirable for operating the pipet. Below is an example sequence of valve operation. The valve operation may be varied without adversely effecting the accuracy and precision of the inventive pipet.

Description of Steps:
0. Start with valves 46, 58, 70 and 72 closed.
1. Fluid is delivered through the fill valve 58. The fluid flows through the passageway 38 through the restriction member 32 and into the measuring chamber 54.
2. The drain valve 46 is opened and excess liquid drained out of the manifold.
3. The fill valve 58 is closed.
4. Gas valve 70 is opened briefly to ensure that excess liquid drains through the drain valve 46 and into drain line 42.
5. The drain valve 46 is closed.
6. The compressed gas valve 70 is opened. The increased pressure inside interior space 18 activates a pressure actuated dispense valve 72 to allow the measured liquid within measuring chamber 54 to exit via the open dispense valve 72.
7. The compressed gas valve 70 is closed.
8. The drain valve 46 is opened to relieve pressure.
9. Step 5 is repeated
10. Step 6 is repeated
11. Step 7 is repeated
12. Step 8 is repeated
13. Step 9 is repeated Alternatively, step 9 could comprise "close drain valve 46" and steps 10–13 could be eliminated. Steps 10–13 are cautionary to ensure that all measured liquid has been discharged.

Steps for one method of operation are presented in the below Table.

| Step | Fill Valve 58 | Drain Valve 46 | Gas Valve 70 | Dispense Valve 72 |
|------|---------------|----------------|--------------|-------------------|
| 0 | Close | Close | Close | Close |
| 1 | Open | Close | Close | Close |
| 2 | Open | Open | Close | Close |
| 3 | Close | Open | Close | Close |
| 4 | Close | Open | Pulse | Close |
| 5 | Close | Close | Close | Close |
| 6 | Close | Close | Open | Open |
| 7 | Close | Close | Close | Close |
| 8 | Close | Open | Close | Close |
| 9 | Close | Close | Close | Close |
| 10 | Close | Close | Open | Open |
| 11 | Close | Close | Close | Close |
| 12 | Close | Open | Close | Close |
| 13 | Close | Close | Close | Close |

As described above, a novel pipet is taught for automatically and inexpensively extracting an aliquot of liquid from one source, measuring a predetermined volume of the liquid and transferring the volume of liquid to a different vessel. Benefits of the novel pipet include simplicity and therefore low expense to manufacture, ease of automation, minimization of the volume of liquid that must be used to rinse the apparatus, elimination of a need to reposition the pipet after liquid has been introduced into the pipet, elimination of expensive syringe pumps that are used in typical automated pipetting systems, elimination of the use of suction to fill the pipet with liquid, and use of gravity and overflow rather than a syringe pump to measure volume.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

What is claimed is:

1. A flow through pipet comprising:
   a body defining an interior space for receiving a fluid;
   an overflow drain line having an inlet, said overflow drain line communicating said interior space with an exterior of said body;
   a dispense valve on a lower end of said body for selectively emptying fluid from said body;
   wherein said overflow drain line is for draining fluid above said drain line inlet, thereby establishing a repeatable upper fluid level in said body;
   a reduced diameter passageway for minimizing a surface area of an upper surface of said fluid, thereby yielding a greater accuracy in establishing an upper fluid level in said reduced diameter passageway; and
   a compressed gas line in communication with said interior space at a location above said drain line inlet for communicating a compressed gas source with said interior space.

2. A flow through pipet comprising:
   a body defining an interior space for receiving a fluid;
   an overflow drain line having an inlet, said overflow drain line communicating said interior space with an exterior of said body;
   a dispense valve on a lower end of said body for selectively emptying fluid from said body;
   wherein said overflow drain line is for draining fluid above said drain line inlet, thereby establishing a repeatable upper fluid level in said body;
   a reduced diameter passageway for minimizing a surface area of an upper surface of said fluid, thereby yielding a greater accuracy in establishing an upper fluid level in said reduced diameter passageway; and
   a pump for drawing excess fluid out of said drain line.

3. A flow through pipet comprising:
   a body defining an interior space for receiving a fluid;
   an overflow drain line having an inlet, said overflow drain line communicating said interior space with an exterior of said body;
   a dispense valve on a lower end of said body for selectively emptying fluid from said body;
   wherein said overflow drain line is for draining fluid above said drain line inlet, thereby establishing a repeatable upper fluid level in said body;
   a reduced diameter passageway for minimizing a surface area of an upper surface of said fluid, thereby yielding a greater accuracy in establishing an upper fluid level in said reduced diameter passageway; and wherein
   said upper end of said body receives sample fluid from a continuous supply source.

4. A flow through pipet comprising:
   a plurality of bodies forming a multi-pipet assembly, wherein each of said plurality of bodies comprises:
      an overflow drain line having an inlet, said overflow drain line communicating said interior space with an exterior of said body;
      a dispense valve on a lower end of said body for selectively emptying fluid from said body;
      a reduced diameter passageway for minimizing a surface area of an upper surface of said fluid;
      wherein said overflow drain line is for draining fluid above said drain line inlet, thereby establishing a repeatable upper fluid level in said body.

5. The flow through pipet according to claim 4 wherein:
   said interior space within each of said plurality of bodies communicate with one another via a passageway.

6. The flow through pipet according to claim 4 further comprising:
   a fill line in communication with said interior space of each of said plurality of bodies.

7. A flow through pipet comprising:
   a plurality of bodies forming a multi-pipet assembly, wherein each of said plurality of bodies comprises:
      a restriction member located in each of said plurality of bodies, said restriction member having a lower surface, an upper surface, and having inner walls between said upper surface and said lower surface, said inner walls defining a passageway;
      a drain line having an inlet, said drain line communicating said passageway with an exterior of each of said plurality of bodies;
      said drain line inlet defining an upper end of a measuring section of said interior space and defining a lower end of an overflow section in said interior space;
      a dispense valve on said lower end of each of said plurality of bodies for selectively emptying fluid from said measuring section of each of said plurality of bodies;
      wherein said drain line is for draining fluid above said drain line inlet, thereby establishing a repeatable upper maximum fluid level in said measuring section.

8. A method of pipetting fluids comprising the steps of:

delivering a fluid into a measuring chamber through an upper end of a body;

filling said measuring chamber with said fluid until an upper surface of said fluid contacts an inlet of an overflow drain line;

draining said fluid out of said overflow drain line to establish an upper fluid level in said measuring chamber thereby defining a predetermined volume of fluid in said measuring chamber;

delivering said predetermined volume of fluid out of a lower end of said body; and delivering fluid into a second measuring chamber of a second body wherein said body and said second body comprise a multi-pipet assembly;

said method further comprising:

filling said measuring chamber of said body and said second body with said fluid until an upper surface of said fluid contacts said inlet of an overflow drain line and an inlet of a second overflow drain line;

draining said fluid out of said overflow drain line and said second overflow drain line to establish an upper fluid level in said measuring chamber and a second measuring chamber thereby defining a predetermined volume of fluid in said measuring chamber and said second measuring chamber; and delivering said predetermined volume of fluid out of a lower end of said body and said second body.

9. A method of pipetting fluids comprising the steps of:

delivering a fluid into a measuring chamber through an upper end of a body;

filling said measuring chamber with said fluid until an upper surface of said fluid contacts an inlet of an overflow drain line;

draining said fluid out of said overflow drain line to establish an upper fluid level in said measuring chamber thereby defining a predetermined volume of fluid in said measuring chamber;

delivering said predetermined volume of fluid out of a lower end of said body; and wherein said step of delivering said predetermined volume of fluid comprises applying compressed gas above said measuring chamber to force said sample fluid out of said body.

10. A method of pipetting fluids further comprising the steps of:

delivering a fluid into a measuring chamber through an upper end of a body;

filling said measuring chamber with said fluid until an upper surface of said fluid contacts an inlet of an overflow drain line;

draining said fluid out of said overflow drain line to establish an upper fluid level in said measuring chamber thereby defining a predetermined volume of fluid in said measuring chamber;

delivering said predetermined volume of fluid out of a lower end of said body; and wherein recirculating fluid drained from said drain line through a recirculation line and into said upper end of said body.

* * * * *